United States Patent Office 3,360,124
Patented Dec. 26, 1967

3,360,124
STERILE ALKYL ESTER OF 2-CYANOACRYLATE
Albert A. Stonehill, Plainfield, N.J., assignor to Ethicon, Inc., a corporation of New Jersey
No Drawing. Filed May 18, 1966, Ser. No. 550,949
7 Claims. (Cl. 206—84)

ABSTRACT OF THE DISCLOSURE

Alkyl 2-cyanoacrylate esters are packaged in a sealed tin container and sterilized by heating at 125° C. for one hour.

---

The present invention relates to a method of packaging and sterilizing alkyl 2-cyanoacrylate and more specifically to a hermetically-sealed tin container having therein a sterile alkyl ester of 2-cyanoacrylate.

The chemistry and performance of the alkyl 2-cyanoacrylate adhesive is described in an article by H. W. Coover, Jr., F. B. Joyner, N. H. Shearer, Jr., and T. W. Wicker, Jr., published in the Society of Plastics Engineers Journal, volume 15, Number 5, pages 3–7 (May 1959). The ability of the alkyl 2-cyanoacrylate to polymerize rapidly at room temperature in the absence of a solvent or added catalyst has resulted in the investigation of this class of monomers for surgical applications. A number of papers have recently been published relating to experimental work designed to evaluate the use of methyl 2-cyanoacrylate monomers as a physiological adhesive in bronchial closure, the anastomosis of small arteries, intestinal anastomosis, and cutaneous lacerations. The problem of sterility, however, remained to be resolved before the alkyl 2-cyanoacrylate could be evaluated clinically in human patients.

The use of small amounts of sulfur dioxide, hydroquinone, and butylated hydroxyanisole to stabilize the alkyl 2-cyanoacrylate against premature polymerization is described in U.S. Patent No. 2,765,332. It was hoped that the presence of sulfur dioxide in the alkyl 2-cyanoacrylate adhesive compositions would result in a self-sterilizing composition; the sulfur odixide acting in the dual role of polymerization inhibitor and sterilizing agent. This hope was quickly dispelled when it was established that lyophilized spores of *Bacillus pumilus*, *Clostridium tetanus*, *Clostridium sporogenes*, and *Bacillus subtilis* remained viable in alkyl 2-cyanoacrylate compositions containing from 40 p.p.m. to 2,000 p.p.m. of sulfur dioxide.

Filtration methods of sterilizing alkyl 2-cyanoacrylate using fine pore filters accepted in the industry having a pore size of 0.01 micron (Seitz S–3) were not satisfactory because the monomer polymerized within the pore.

Irradiation of packaged alkyl 2-cyanoacrylate with γ-rays from cobalt 60 or with β-particles, resulted in immediate polymerization. Sterilization of the alkyl 2-cyanoacrylate by heat at 160° C., resulted in polymerization, as did sterilization at lower temperatures (125° C.) when the alkyl 2-cyanoacrylate was packaged in glass ampules or in polyethylene tubes.

It has now been discovered that alkyl 2-cyanoacrylate monomer may be packaged in tin containers and sterilized by heating between about 100° C. and about 125° C. for about one to two hours. There is no substantial change in viscosity when the alkyl 2-cyanoacrylate monomer is sterilized in this manner and tests of two years' duration have confirmed the stability of the sterilized alkyl 2-cyanoacrylate when hermetically sealed in tin containers. Preferably collapsible tin tubes are used, the tubes being fabricated of sheet metal analyzing at least 99.0 percent tin and no more than 0.7 percent copper. The metal is approximately 4 mils in thickness.

The method of the present invention may be used effectively to sterilize the lower alkyl esters of 2-cyanoacrylate, such as the methyl, ethyl, propyl, butyl, amyl, hexyl, heptyl, and octyl esters which polymerize rapidly at elevated temperatures as well as the higher alkyl esters, such as, the palmityl ester or similar alkyl esters having up to 16 or more carbon atoms. As much as 25 percent by weight of a polymerized or partially polymerized alkyl 2-cyanoacrylate may be dissolved in a liquid monomer alkyl 2-cyanoacrylate of identical or homologous composition, and the mixture sterilized in accordance with this invention without substantial change in the viscosity of the mixture.

The following examples illustrate procedures suitable for the packaging and sterilization of alkyl 2-cyanoacrylate but are not intended to limit the scope of this invention. Throughout the examples that follow, all quantities are expressed in parts by weight unless otherwise indicated.

EXAMPLE I

Five tin tubes are filled to 50 percent of capacity with methyl 2-cyanoacrylate monomer, having dissolved therein 150 parts per million of sulfur dioxide and 40 parts per million of hydroquinone. The methyl 2-cyanoacrylate in four of the five tubes is inoculated with lyophilized bacterial spores (approximately $10^4$ spores per milliliter). The first tube is inoculated with *Clostridium tetanus*, the second with *Clostridium sporogenes*, the third with *Bacillus pumilus*, and the fourth with *Bacillus subtilis*. The fifth tube is used as a control.

The five tubes are hermetically sealed and autoclaved in a steam autoclave for one hour at 125° C.

After one month's storage, each tube is opened and a portion of its contents dropped into a sterile tube containing distilled water causing exothermic polymerization of the monomer to form an insoluble polymer of methyl 2-cyanoacrylate. Sterile glass beads are added to each tube containing the polymer; the tube is sealed and mechanically shaken until the glass beads have reduced the polymer to a fine particle size.

The contents of each glass tube are then transferred under sterile conditions to Eugonbroth and fluid thioglycolate. That there is no bacterial growth after incubation indicates the effectiveness of sterilization at 125° C. for one hour.

Identical results are obtained when the tubes containing methyl 2-cyanoacrylate are inoculated with bacterial spores and are heated for two hours at 100° C.

Shelf life tests conducted at room temperature, extending over a period of two years, show that no substantial change of viscosity occurs when methyl 2-cyanoacrylate is sterilized as described above.

Methyl 2-cyanoacrylate, if heated in this container at 160° C. for one hour, will polymerize to give a solid product unsuitable for use as a surgical adhesive.

EXAMPLE II

Ethyl 2-cyanoacrylate is placed in a hermetically-sealed tin tube and heat sterilized as described above in Example I. The viscosity of the ethyl 2-cyanoacrylate prior to sterilization is 2 cps. After heating in a tin container for 1 hour at 125° C., the viscosity is 2 cps.

EXAMPLE III

Propyl 2-cyanoacrylate is placed in a hermetically-sealed tin tube and heat sterilized as described above in Example I. The viscosity of the propyl 2-cyanoacrylate prior to sterilization is 2.4 cps. After heating in a tin container for 1 hour at 125° C., the viscosity is 2.4 cps.

EXAMPLE IV

Butyl 2-cyanoacrylate is placed in a hermetically-sealed tin tube and heat sterilized as described above in Example I. The viscosity of the butyl 2-cyanoacrylate prior to sterilization is 1.6 cps. After heating in a tin container for 1 hour at 125° C., the viscosity is 2.4 cps.

EXAMPLE V

Isobutyl 2-cyanoacrylate is placed in a hermetically-sealed tin tube and heat sterilized as described above in Example I. The viscosity of the isobutyl 2-cyanoacrylate prior to sterilization is 2.3 cps. After heating in a tin container for 1 hour at 125° C., the viscosity is 3.3 cps.

EXAMPLE VI

A mixture of 75 percent methyl 2-cyanoacrylate and 25 percent methyl 2-cyanoacrylate polymer obtained by heating methyl 2-cyanoacrylate under nitrogen at 65° C. for 30 hours is hermetically-sealed in a tin tube and heat sterilized as described in Example I above. The viscosity of the methyl 2-cyanoacrylate mixture prior to sterilization is 74 cps. After heating in a tin container at 125° C. for 1 hour, the viscosity of the mixture is 447 cps.

What is claimed is:

1. A hermetically-sealed tin container having therein a sterile alkyl ester of 2-cyanoacrylate.
2. The product of claim 1 wherein the alkyl ester is methyl 2-cyanoacrylate.
3. The product of claim 1 wherein the alkyl ester is methyl 2-cyanoacrylate.
4. The product of claim 1 wherein the alkyl ester is n-propyl 2-cyanoacrylate.
5. The product of claim 1 wherein the alkyl ester is isobutyl 2-cyanoacrylate.
6. The product of claim 1 wherein the alkyl ester is n-butyl 2-cyanoacrylate.
7. The product of claim 1 wherein the container is a collapsible tin tube.

References Cited

FOREIGN PATENTS 343,849  2/1931  Great Britain.

JOSEPH R. LECLAIR, *Primary Examiner.*

THERON E. CONDON, *Examiner.*

J. M. CASKIE, *Assistant Examiner.*

UNITED STATES PATENT OFFICE

CERTIFICATE OF CORRECTION

Patent No. 3,360,124                                 December 26, 1967

Albert A. Stonehill

It is certified that error appears in the above identified patent and that said Letters Patent are hereby corrected as shown below:

Column 1, line 42, "odixide" should read -- dioxide --.
Column 4, line 6, "methyl" should read -- ethyl --.

Signed and sealed this 3rd day of March 1970.

(SEAL)
Attest:

Edward M. Fletcher, Jr.                         WILLIAM E. SCHUYLER, JR.
Attesting Officer                                          Commissioner of Patents